(12) United States Patent
Fenile et al.

(10) Patent No.: US 10,040,641 B2
(45) Date of Patent: Aug. 7, 2018

(54) METHOD FOR EMPTYING THE POCKETS OF A TRANSPORT DEVICE IN THE FORM OF A SUSPENSION CONVEYOR, AND DEVICE FOR CARRYING OUT SAID METHOD

(71) Applicant: FERAG AG, Hinwil (CH)

(72) Inventors: Roberto Fenile, Wetzikon (CH); Marc-Andreas Benz, Saland (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/542,887

(22) PCT Filed: Jan. 7, 2016

(86) PCT No.: PCT/EP2016/050161
§ 371 (c)(1),
(2) Date: Jul. 11, 2017

(87) PCT Pub. No.: WO2016/120032
PCT Pub. Date: Aug. 4, 2016

(65) Prior Publication Data
US 2018/0002115 A1    Jan. 4, 2018

(30) Foreign Application Priority Data

Jan. 26, 2015 (CH) .......................... 89/15
Apr. 27, 2015 (CH) .......................... 573/15

(51) Int. Cl.
*B65G 47/61* (2006.01)
*B65G 9/00* (2006.01)
(Continued)

(52) U.S. Cl.
CPC ............. *B65G 47/61* (2013.01); *B65G 9/004* (2013.01); *B65G 17/20* (2013.01); *B65G 19/025* (2013.01);
(Continued)

(58) Field of Classification Search
CPC ........ B65G 9/002; B65G 9/004; B65G 17/20; B65G 19/025; B65G 47/36; B65G 47/38; B65G 47/61; B65G 2201/0238
See application file for complete search history.

(56) References Cited

U.S. PATENT DOCUMENTS 4,104,156 A    8/1978  Fletcher
4,140,163 A *  2/1979  Usner ................... A47F 7/19
                                                   206/287
(Continued)

FOREIGN PATENT DOCUMENTS

CH    00089/15    1/2015
DE    12 233 777  2/1967
(Continued)

OTHER PUBLICATIONS

Co-pending U.S. Appl. No. 15/542,880, Fenile, R. et al., "Method for Filling the Pockets of a Transport Device in the Form of a Suspension Conveyor and Device for Carrying Out Said Method," filed Jul. 11, 2017.
(Continued)

*Primary Examiner* — Gene O Crawford
*Assistant Examiner* — Keith R Campbell
(74) *Attorney, Agent, or Firm* — Pauley Erickson & Kottis (57) ABSTRACT

A method for emptying the pockets of a transport device in the form of a suspension conveyor, the transport device including one or more trolleys which are movably mounted on a trolley track and on each of which a pocket hanging downwards for receiving goods is arranged, the pocket formed by at least one flexible material web that is planar when open and that is fastened at both ends to the trolley, forming a loop hanging downwards. The material web is releasably fastened by at least one end to the trolley. The method includes: advancing a closed pocket, opening the
(Continued)

pocket by releasing the fastening of the at least one end of the material web to the trolley, emptying the goods from the opened pocket, closing the pocket by fastening the at least one end of the material web to the trolley, and transporting away the emptied and closed pocket.

9 Claims, 10 Drawing Sheets

(51) Int. Cl.
  *B65G 47/44* (2006.01)
  *B65G 47/38* (2006.01)
  *B65G 17/20* (2006.01)
  *B65G 19/02* (2006.01)

(52) U.S. Cl.
  CPC ............ *B65G 47/38* (2013.01); *B65G 47/44* (2013.01); *B65G 2201/0238* (2013.01)

(56) References Cited

U.S. PATENT DOCUMENTS

| | | | | |
|---|---|---|---|---|
| 5,216,949 | A | 6/1993 | Bertozzi | |
| 8,672,118 | B2* | 3/2014 | Janzen | B65G 47/61 198/678.1 |
| 9,630,751 | B1* | 4/2017 | Otto | B65G 17/20 |
| 9,828,182 | B2* | 11/2017 | Schoenenberger | B65G 17/20 |
| 2012/0216917 | A1 | 8/2012 | Janzen | |
| 2014/0284179 | A1* | 9/2014 | Janzen | B65G 17/20 198/703 |
| 2016/0159558 | A1* | 6/2016 | Schneuing | B65D 29/00 206/282 |
| 2017/0088302 | A1* | 3/2017 | Auf Der Maur | B65B 43/42 |

FOREIGN PATENT DOCUMENTS

| | | | | |
|---|---|---|---|---|
| DE | 2 221 318 | | 11/1973 | |
| DE | 81 33 433 | | 4/1982 | |
| DE | 38 40 521 | A1 | 6/1990 | |
| DE | 40 42 375 | A1 | 12/1991 | |
| DE | 689 07 399 | T2 | 10/1993 | |
| DE | 692 01 185 | T2 | 5/1995 | |
| DE | 297 09 547 | U1 | 9/1997 | |
| DE | 196 14 905 | A1 | 11/1997 | |
| DE | 103 09 127 | A1 | 9/2004 | |
| DE | 10 2004 018569 | A1 | 11/2005 | |
| DE | 10 2008 026720 | A1 | 12/2009 | |
| DE | 10 2008 061 685 | A1 | 6/2010 | |
| DE | 10 2010 033 905 | A1 | 2/2012 | |
| DE | 10 2010 053 590 | A1 | 6/2012 | |
| DE | 10 2011 015 138 | A1 | 9/2012 | |
| DE | 10 2011 101987 | A1 | 11/2012 | |
| DE | 10 2012 018925 | A1 | 3/2014 | |
| DE | 10 2012 108757 | A1 | 3/2014 | |
| DE | 10 2013 205172 | A1 | 9/2014 | |
| DE | 10 2014 203 298 | A1 | 8/2015 | |
| EP | 1 420 105 | A1 | 5/2004 | |
| EP | 1 420 106 | A1 | 5/2004 | |
| EP | 2 130 968 | A1 | 12/2009 | |
| EP | 2130968 | A1 * | 12/2009 | ............ B07C 3/087 |
| EP | 2 196 415 | A2 | 6/2010 | |
| EP | 2 418 160 | A1 | 2/2012 | |
| EP | 2 620 394 | A1 | 7/2013 | |
| EP | 2 708 478 | B1 | 3/2014 | |
| EP | 2 786 940 | A1 | 10/2014 | |
| GB | 733 714 | A | 7/1955 | |
| WO | WO-2012156451 | A1 * | 11/2012 | ............ B65G 17/20 |
| WO | WO 2015/124525 | A1 | 8/2015 | |
| WO | WO 2016/030274 | A1 | 3/2016 | |
| WO | WO 2016/030275 | A1 | 3/2016 | |

OTHER PUBLICATIONS

Co-pending U.S. Appl. No. 15/542,893, Fenile, R., "Transport Device, in Particular in the Form of a Suspension Conveyor," filed Jul. 11, 2017.

Co-pending U.S. Appl. No. 15/692,605, Fenile, R., "Method for Opening a Transport Pocket Suspended on a Carriage As Well As a Pocket Opening Device for Performing the Method," filed Aug. 31, 2017.

* cited by examiner

METHOD FOR EMPTYING THE POCKETS OF A TRANSPORT DEVICE IN THE FORM OF A SUSPENSION CONVEYOR, AND DEVICE FOR CARRYING OUT SAID METHOD

BACKGROUND OF THE INVENTION

Field of the Invention

The present invention relates to the field of conveying technology. It relates to a method for emptying the pockets of a transport device in the form of a suspension conveyor.

The invention further relates to a device for carrying out the method.

Discussion of Related Art

In the prior art a wide variety of suspension conveyors are known, in which the goods to be conveyed are received by transport pockets which are configured in a relatively complex manner and which are provided with complex opening and closing mechanisms which, in particular with a larger conveying system with many individual pockets, on the one hand, result in a significantly increased cost when setting up a new system and, on the other hand, in continuous operation have a greater susceptibility to malfunctions or complete functional failure.

The publication DE 10 2008 061 685 A1 discloses a loading station for transport pockets which are transported in a suspension conveyor system, comprising an upper supply rail for the transport pockets, comprising a vertical conveyor adjoining the supply rail for supplying the transport pockets into a lower loading position, comprising a device for opening the transport pockets in the loading position and comprising a lower discharge rail adjoining the vertical conveyor for discharging the transport pockets from the loading position.

The publication DE 10 2008 026 720 A1 discloses a transport pocket comprising a support wall which is provided at its upper region with a support coupling and a pivotable clamp, at its lower region with at least one coupling and at its upper region with means for opening the coupling and with means for closing the coupling, and comprising a bottom side wall which is flexible at least in the lower region and which is connected in its upper region to the pivotable clamp and in its lower region is provided with counter coupling means for receiving in the at least one coupling.

The publication DE 10 2011 101 987 A1 discloses a transport pocket for conveying conveyed goods in a conveying system, in particular a suspension conveying system, comprising a carrier part which is configured for receiving on a conveyor belt of the conveying system, comprising a loading aid for receiving the conveyed goods, wherein the loading aid comprises a closure flap which has a handling tab with a clamping portion, wherein the carrier part comprises a clamping device with a clamping lever which is able to be displaced between a retaining position in which a retaining force acts on the clamping portion and a released position, and wherein the clamping lever is coupled to the clamping portion in the retaining position, such that the received conveyed goods effect by the weight thereof an increase in the retaining force.

The publication DE 10 2012 108 757 A1 relates to a support pocket for a suspension conveying device for the suspended transport of objects, comprising a retaining frame, a pocket pouch which is suspended on the retaining frame and by which objects to be transported are able to be received, and a suspension element which is connected to the retaining frame and by means of which the support pocket is able to be suspended on the suspension conveying device, in order to be transported suspended from the suspension conveying device. The pocket pouch has a first pouch portion and a second pouch portion which in each case comprise a first pouch end portion connected to the retaining frame and a second pouch end portion remote from the retaining frame, wherein the second pouch end portions are connected together via a joint mechanism which is able to be brought into an unloading position in which the second pouch end portions are arranged spaced apart from one another, so that for dispensing objects the pocket pouch is provided with an outlet opening formed between the two pouch end portions and is able to be brought into a loading position in which the second pouch end portions are arranged adjacent to one another so that the outlet opening is closed and the pocket pouch is able to receive objects.

The publication DE 10 2013 205 172 A1 discloses a transport pocket for the suspended transport of goods. The transport pocket has a rigid carrying wall which in its upper portion in the transport position is connected to a carrying element for carrying the transport pocket in a suspended manner. A flexible goods-retaining wall forms with the carrying wall a carrying pocket which is closed downwardly at least in the transport position of the transport pocket and toward two opposing sides. The carrying wall is connected to the retaining wall between an upper wall connecting portion in the transport position and a lower wall connecting portion in the transport position, such that a length of the web-shaped retaining wall between the two wall connecting portions may be adapted in a variable manner to the transport of different goods. The design of the transport pocket is such that this longitudinal adaptation of the retaining wall takes place by a relative displacement of the retaining wall to the carrying wall at least in the region of one of the two connecting portions.

A novel transport device has been disclosed in a Swiss patent application filed on 26 Jan. 2015 CH 00089/15, in which laterally open pockets are formed from a material web by suspending on both ends, forming a loop, said pockets being able to be moved on running rails, suspended on a carriage. The pockets are opened by the one end of the material web being unhooked and closed again by the end of the material web being correspondingly hooked up.

SUMMARY OF THE INVENTION

It s the object of the invention, therefore, to provide a method for the automatic emptying of such pockets and to provide a corresponding device for carrying out the method.

This and further objects are achieved by the features of the subject invention.

The method according to the invention is provided for emptying the pockets of a transport device in the form of a suspension conveyor, which transport device comprises one or more carriages which are movably mounted on a running rail in the running rail direction and in each case a downwardly hanging pocket being arranged thereon for receiving transported goods, wherein the pocket is formed by at least one flexible material web which is planar in the open state and which is fastened at both ends to the carriage, forming a downwardly hanging carrying loop and/or transport loop, and wherein the material web is releasably fastened to the carriage on at least one end of the material web.

The method according to the invention includes by the steps: (a) advancing a pocket in the closed state, (b) opening the pocket by releasing the fastening of the at least one end of the material web to the carriage, (c) emptying the transported goods from the opened pocket, (d) closing the pocket by fastening the at least one end of the material web to the carriage, and (e) moving away the emptied and closed pocket.

One embodiment of the method according to the invention is that the advancing of the pocket takes place via the same running rail as the moving-away of the emptied and closed pocket.

In particular, the at least one end of the material web is releasably configured on the carriage by hooking up the one end, wherein the pocket to be emptied is stopped at an emptying device arranged on the running rail, in step (b) the at least one end of the material web is unhooked and in step (d) the at least one end of the material web is hooked up again.

In this case, in particular after unhooking the material web, the unhooked part of the material web is fixed to a suction surface by means of a vacuum and for emptying the pocket the fixed material web is pivoted with the suction surface about a pivot axis sufficiently far into a downwardly oriented oblique position that the transported goods located in the pocket slip down out of the pocket.

Moreover, a grip element may be arranged on at least one end of the material web, wherein for unhooking and/or hooking up the material web, an unhooking and hooking-up mechanism arranged on the suction surface grips and lifts and/or lowers the at least one end of the material web on the grip element.

Moreover, the transported goods slipping out of the pocket may also be conveyed via a slide to a transport device and transported away by means of the transport device.

The device according to the invention for carrying out the method according to the invention in the form of an emptying device comprises a first device for automatically opening and closing the pocket, as well as a second device for folding out the opened pocket.

One embodiment of the device according to the invention is that the first device comprises an unhooking and hooking-up mechanism, which comprises an engagement element which is movable in the vertical direction and which is able to be brought into engagement with a grip element attached to the pocket.

The grip element may, in particular, be of rod-type configuration and, in particular, may be formed by the one transverse rod of the pocket itself.

In particular, the second device comprises a suction surface for the unhooked material web, supplied with a vacuum via a vacuum connection, which suction surface is arranged so as to be pivotable about a pivot axis in a frame below the running rail.

Additionally, a slide which at the upper end adjoins the downwardly pivoted suction surface may be provided.

Moreover, the slide with its lower end may adjoin a transport device for transporting away the emptied transported goods.

BRIEF DESCRIPTION OF SEVERAL VIEWS OF THE DRAWINGS

The invention is intended to be described in more detail hereinafter with reference to exemplary embodiments, in combination with the drawings, in which.

DETAILED DESCRIPTION OF THE INVENTION

Figure 1:
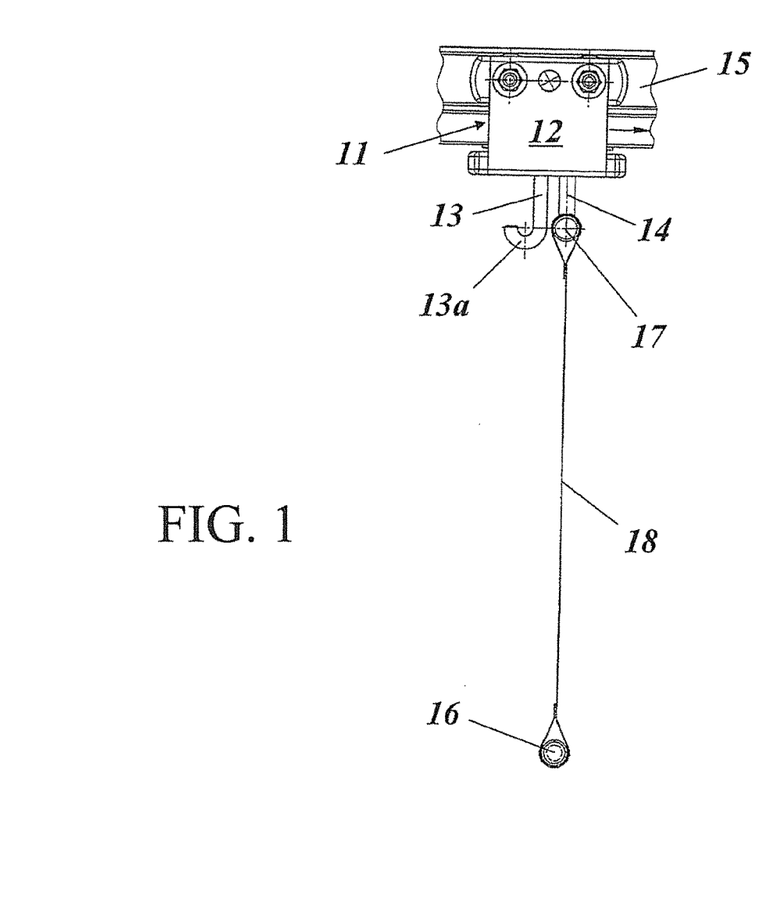
FIG. 1 shows in a side view an example of a transport device suitable for the present invention with a running rail, carriage and a material web, which is able to be hooked up to form a pocket, in the unhooked state.
Figure 2:
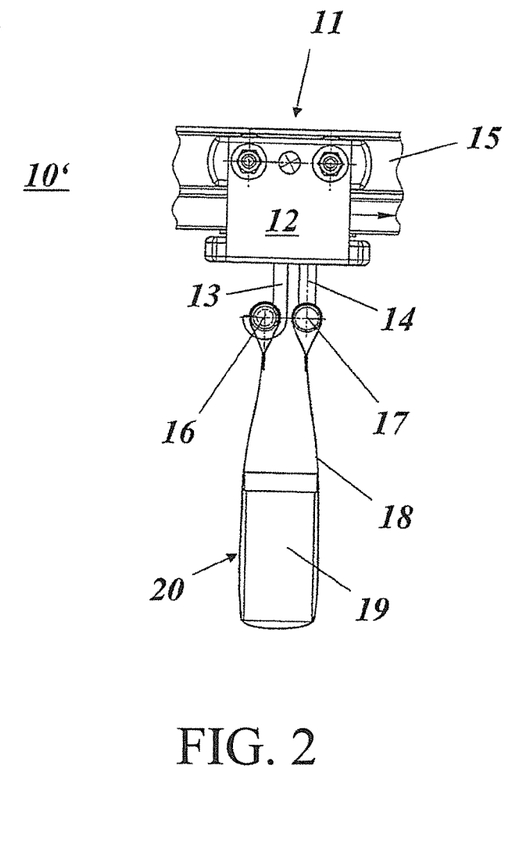
FIG. 2 shows in a side view the device of FIG. 1 with a hooked-up material web forming a pocket and transported goods transported therein.

The transport device 10' of FIGS. 1 and 2 comprises a running rail 15 extending in a direction of conveyance (arrow in FIG. 1) and extending horizontally in the example of FIG. 1, said running rail in the example shown being produced from a metal strip bent repeatedly in a symmetrical manner relative to a vertical central plane and comprising two opposing support rails and a guide rail configured in the bottom in the center having a rectangular profile. A carriage 11, which is suspended on the running rail 15, is movably guided in the direction of the rail. The carriage 11 has a U-shaped carriage body 12 (see FIG. 4) which on both arms in each case bears a pair of supporting rollers 21a and 21b and in the lower region bears guiding rollers 21c by which it engages in the running rail 15 laterally and from below.

Between the lateral roller pairs 21a and 21b, in each case a drive element 22a and 22b protruding outwardly to the side is attached to the carriage body 12, said drive element being able to bring the carriage, if required, into engagement with a drive device, a braking device, a switching device or the like. Protruding vertically downwardly from the lower base of the U-shaped carriage body 12 is a pair of fastening elements 14 and/or 14a, b (FIG. 4) spaced apart transversely to the rail direction and a pair of support elements 13 arranged to the rear thereof in the direction of travel.

The two rod-shaped fastening elements 14 and/or 14a, b are fixedly connected at the lower end to a first transverse rod 17 extending horizontally and transversely and symmetrically to the rail direction. The supporting elements 13 with the associated hook 13a receive a second transverse rod 16 which is arranged parallel to the first transverse rod 17 and which, as it were, may be "hooked into" the hook 13a and removed again or unhooked.

Each of the two transverse rods 16 and 17 is placed in an associated stitched loop of the pocket 20 configured at the end of a rectangular material web 18 which has a predetermined width and length. In the unhooked state (FIG. 1) the material web 18 is only suspended on the carriage 11 via the transverse rod 17 and vertically downwardly with the free transverse rod 16 and thus has the shape of a planar web. In the hooked-up state (FIG. 2) in which the transverse rod 16 is suspended in the hook-shaped supporting elements 13, the material web 18 forms a carrying loop or transport loop and/or pocket 20 which is open to the side, transported goods 19 to be conveyed, for example a packet, small package or the like, being able to be inserted therein.

Figures 3, 4:
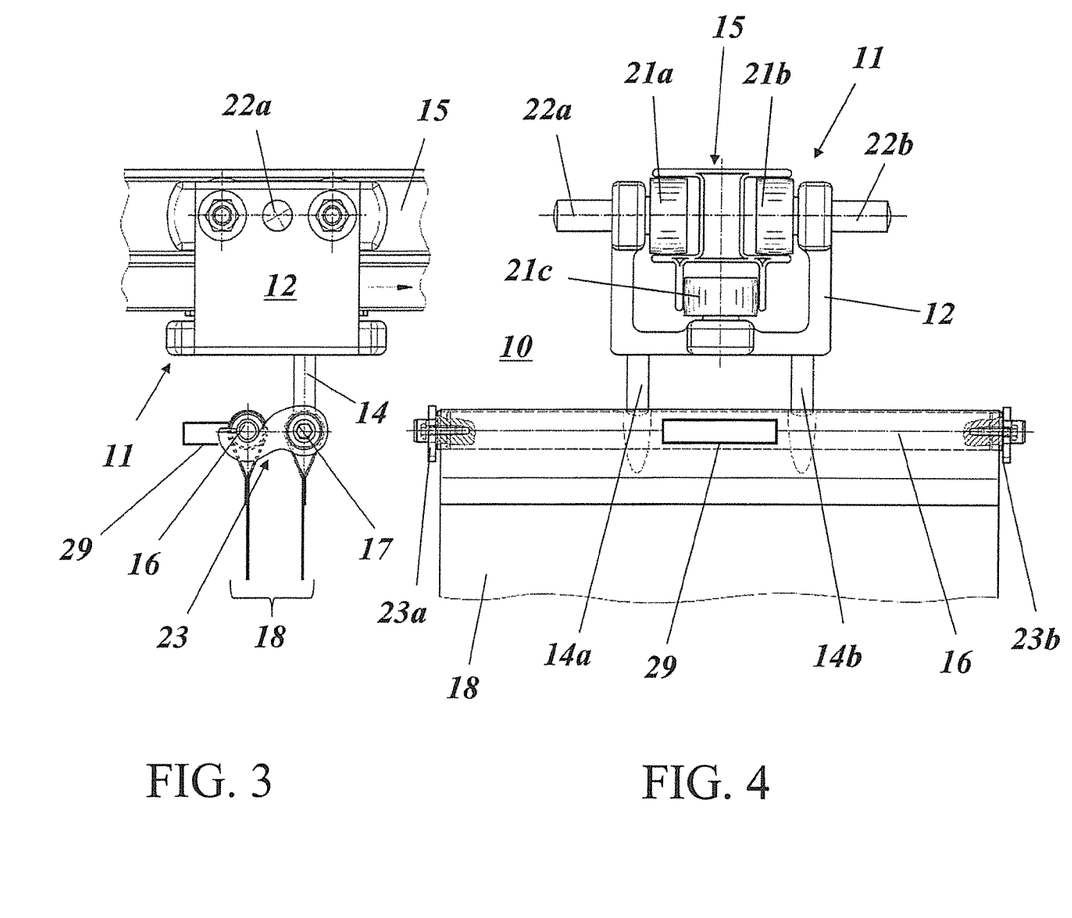
FIG. 3 shows in a side view a further example of a transport device suitable for the present invention with a running rail, carriage and a material web, which is able to be hooked up to form a pocket, in the hooked-up state.
FIG. 4 shows the device of FIG. 3 viewed in the direction of travel.

The exemplary embodiment of FIGS. 3 and 4 which shows a transport device 10 differs from the exemplary embodiment of FIGS. 1 and 2 (transport device 10') in that the hook-shaped supporting elements 13 attached to the carriage body 12 are entirely dispensed with and instead hooks 23 and/or 23a, b are attached to the outer ends of the transverse rod 17 for receiving the transverse rod 16.

Proceeding from this exemplary embodiment of a transport device, the present invention is intended to be described in more detail hereinafter by the exemplary embodiment of an emptying device. FIGS. 5A-H in this case show different chronological images of an animation which reproduces an emptying process using this emptying device schematically and in a highly simplified manner.

Figure 5A:
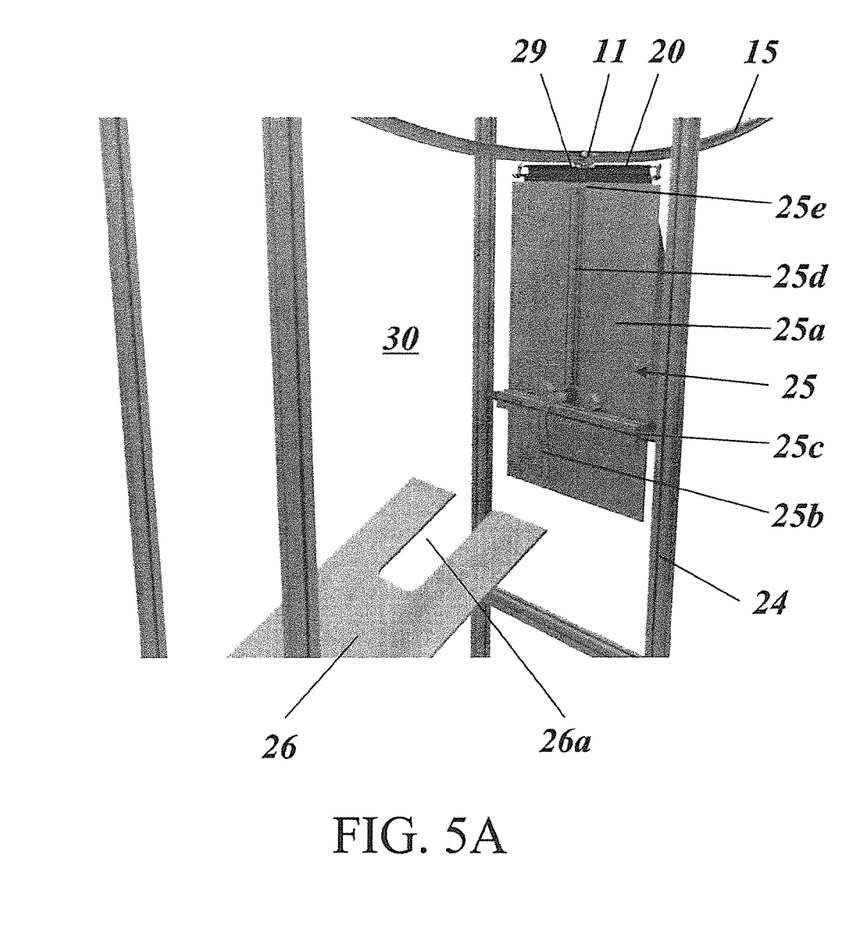
FIG. 5A shows a step of an exemplary embodiment according to the invention when emptying pockets on a running rail, of the type shown in FIGS. 3 and 4.
Figure 5B:
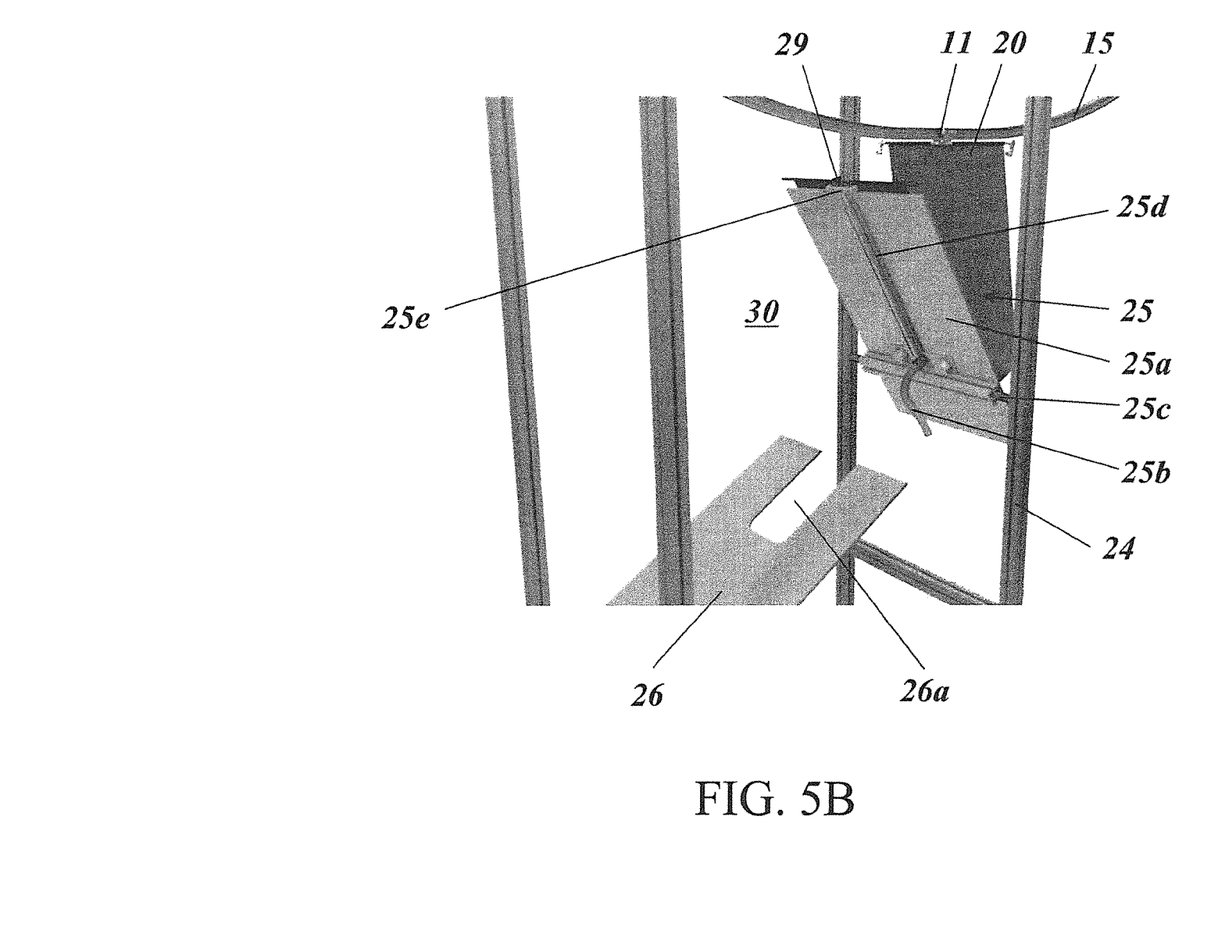
FIG. 5B shows another step of an exemplary embodiment according to the invention when emptying pockets on a running rail, of the type shown in FIGS. 3 and 4.
Figure 5C:
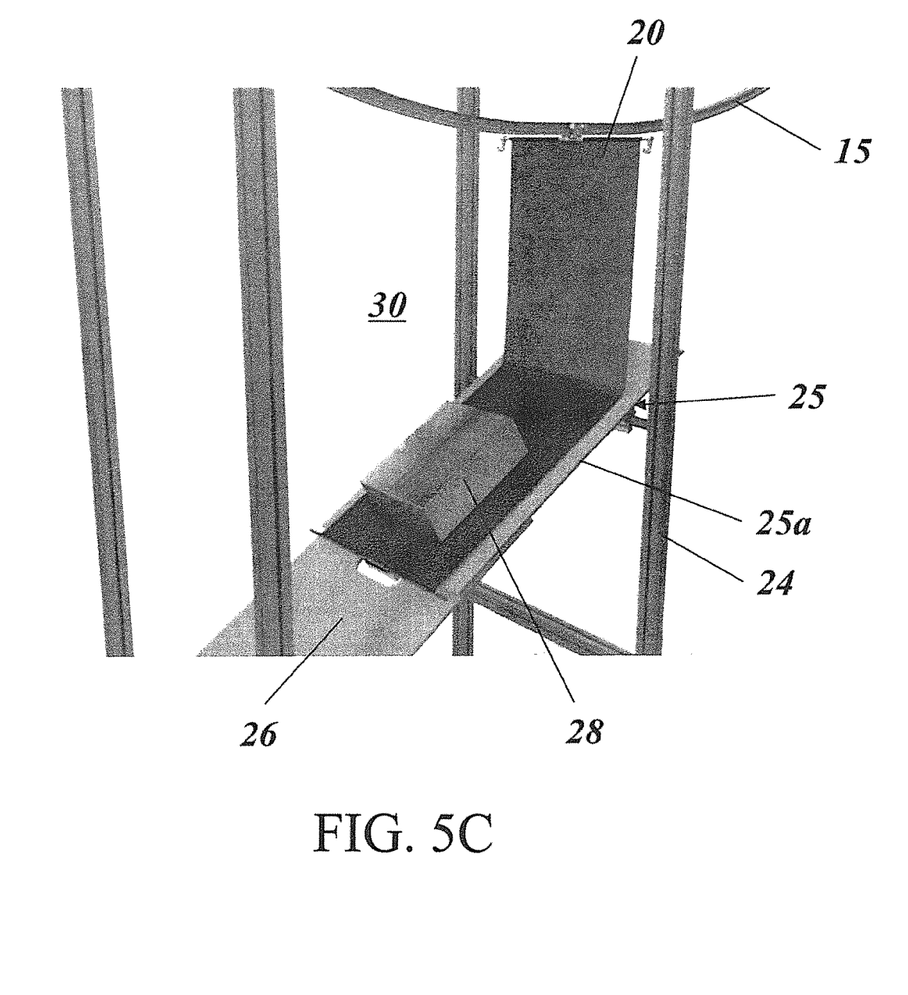
FIG. 5C shows another step of an exemplary embodiment according to the invention when emptying pockets on a running rail, of the type shown in FIGS. 3 and 4.

The emptying device 30 is attached in a frame 24 below the (continuous) running rail 15 (FIG. 5A). The emptying device 30 comprises a folding-out device 25 which in turn comprises a suction surface 25a (which is, for example, plate-shaped) which is pivotably mounted about a pivot axis in the frame 24 and which is supplied with the required vacuum via a vacuum connection 25b on the rear face. The suction surface 25a in the resting state is oriented vertically so that a pocket 20 advanced with its carriage 11 on the running rail 15 moves toward the suction surface 25a and is stopped (FIG. 5A). A grip element 29 arranged on the side of the pocket 20 which is able to be unhooked may in this position be gripped and lifted by the vertically movable engagement element 25e of an unhooking and hooking-up mechanism 25d arranged on the rear face of the suction surface 25a, in order to unhook the releasable side of the pocket.

If this side is unhooked, the part of the material web 18 suspended therewith is fixed by a vacuum on the suction surface 25a and the suction surface 25a with the fixed material web is pivoted outwardly and downwardly (FIG. 5B), whereby the pocket 20 is opened a small distance.

Figure 5D:
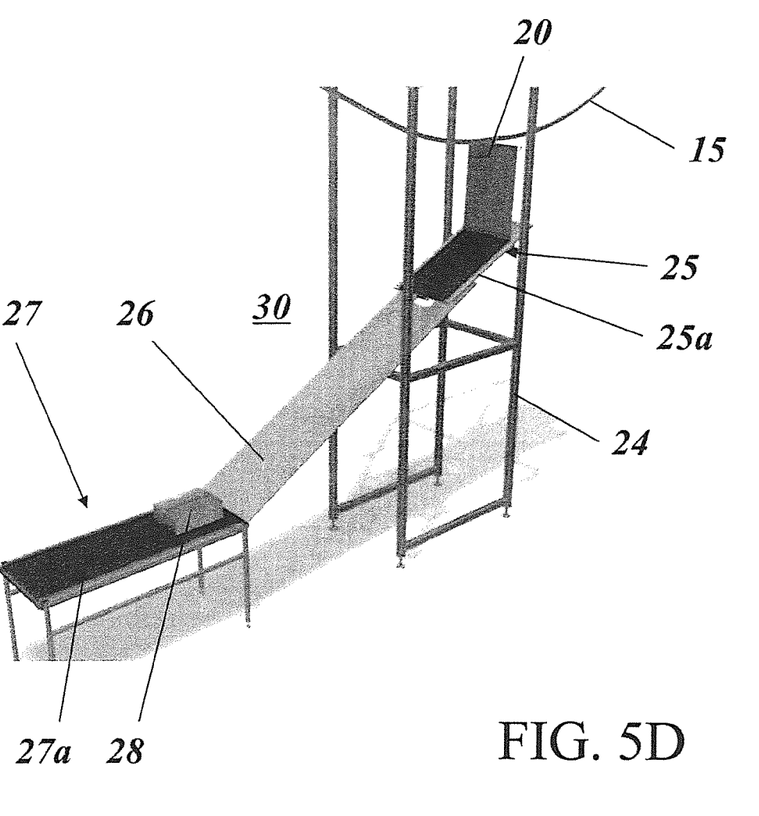
FIG. 5D shows another step of an exemplary embodiment according to the invention when emptying pockets on a running rail, of the type shown in FIGS. 3 and 4.

By pivoting the suction surface 25a well beyond 90° (FIG. 5C) the suction surface facing obliquely downwardly in an end position comes to bear against the upper end of an obliquely downwardly guided slide 26, so that a packet 28 or the like located in the pocket 20 slips out of the pocket 20 due to gravity and downwardly via the slide 26 (FIG. 5D).

Figure 5E:
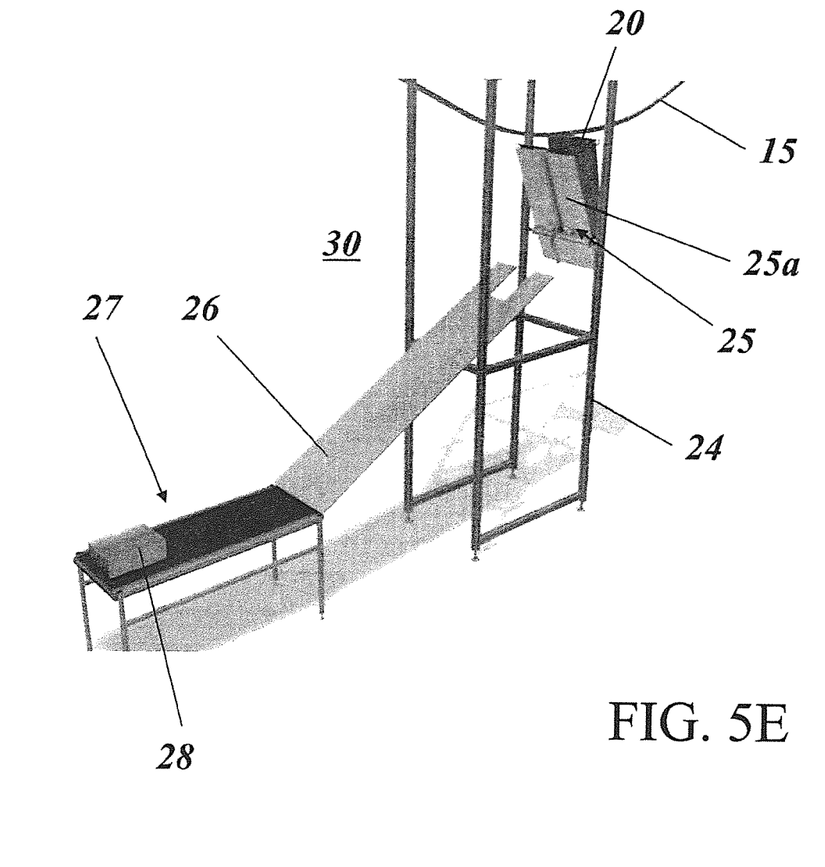
FIG. 5E shows another step of an exemplary embodiment according to the invention when emptying pockets on a running rail, of the type shown in FIGS. 3 and 4.
Figure 5F:
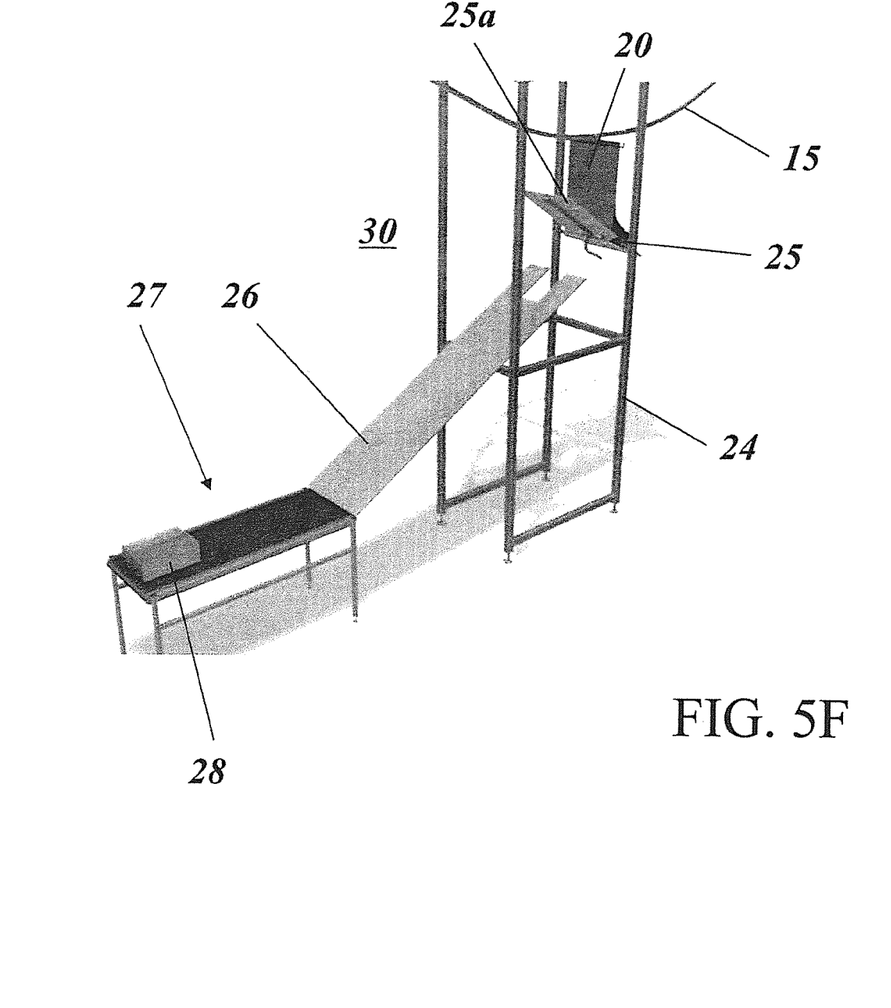
FIG. 5F shows another step of an exemplary embodiment according to the invention when emptying pockets on a running rail, of the type shown in FIGS. 3 and 4.

The lower end of the slide 26 adjoins a horizontal transport device 27 which, for example, transports the packet 28 further by means of a driven transport belt 27a (FIG. 5E).

At the same time, the suction surface 25a of the folding-out device 25 with the suctioned part of the material web 18 again pivots back into the initial position (FIG. 5F) in which the unhooked end of the pocket 20 is able to be hooked up again by means of the unhooking and hooking-up mechanism. The vacuum is then removed by a pressure equalization.

Figure 5G:
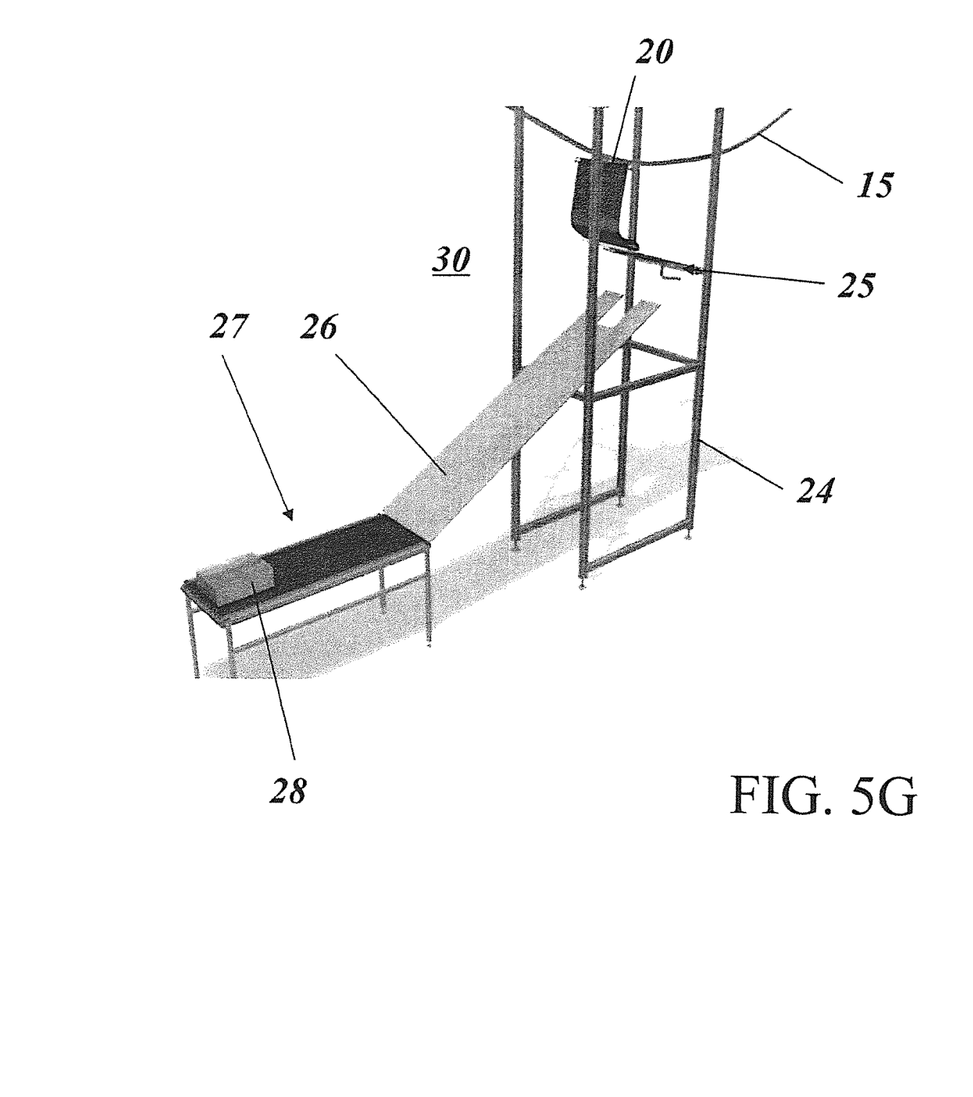
FIG. 5G shows another step of an exemplary embodiment according to the invention when emptying pockets on a running rail, of the type shown in FIGS. 3 and 4.
Figure 5H:
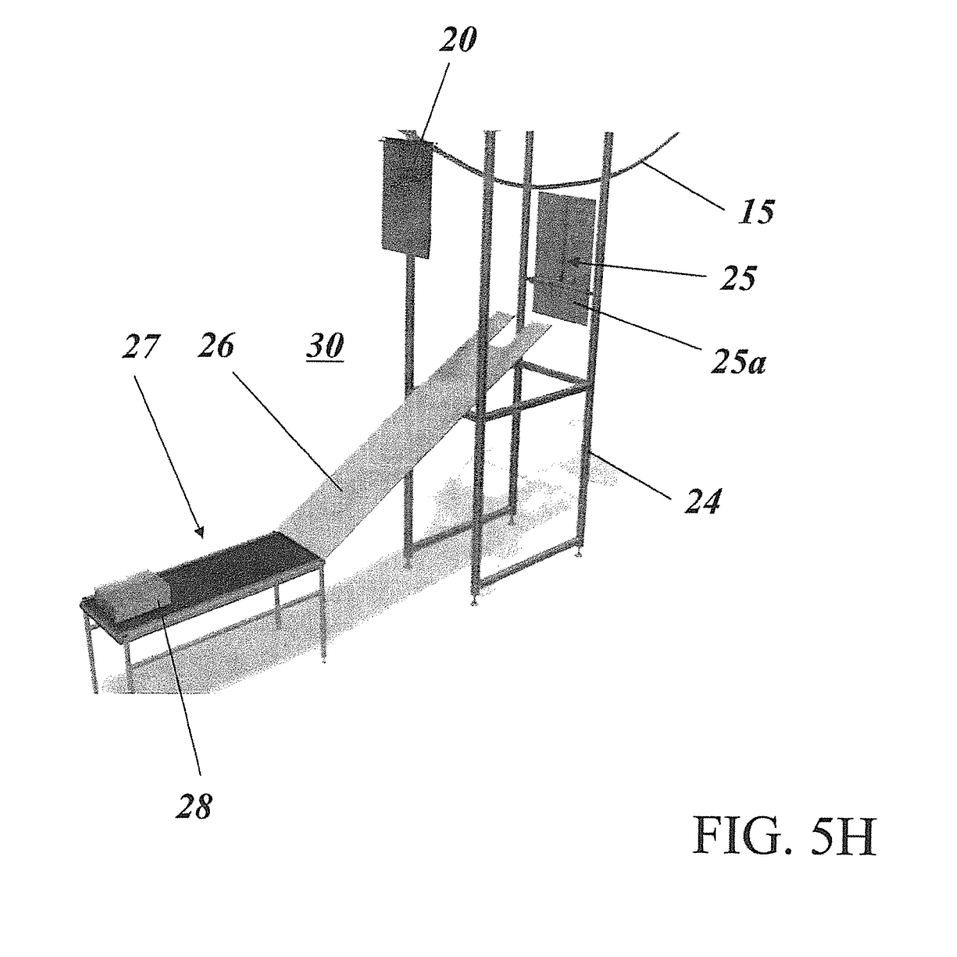
FIG. 5H shows another step of an exemplary embodiment according to the invention when emptying pockets on a running rail, of the type shown in FIGS. 3 and 4.

Once this has occurred, the suction surface of the folding-out device 25 is pivoted again (FIG. 5G) but only sufficiently far that the pocket 20 which is closed again is able to be securely transported away from the folding-out device 25 on the running rail 15 (FIG. 5G).

Lastly, the folding-out device 25 may be folded back again into its initial position (FIG. 5H) and thus is ready for a new emptying process.

The invention claimed is:

1. A method for emptying the pockets (20) of a transport device (10) in the form of a suspension conveyor comprising:
    movably mounting one or more carriages (11) on a running rail (15) in the running rail direction;
    arranging a downwardly hanging pocket (20) on each of the one or more carriages (11) for receiving transported goods (28), wherein the pocket (20) is formed by at least one flexible material web (18) which is planar in an open state and which is fastened at both ends to the carriage (11), forming a downwardly hanging carrying loop and/or transport loop; and
    releasably fastening the material web (18) to the carriage (11) on at least one end (16) of the material web (18), by the steps:
        (a) advancing a pocket (20) in a closed state,
        (b) opening the pocket (20) by releasing the fastening of the at least one end (16) of the material web (18) to the carriage (11),
        (c) emptying, the transported goods (28) from an opened pocket (20),
        (d) closing the pocket (20) by fastening the at east one end (16) of the material web (18) to the carriage (11), and
        (e) moving away an emptied and closed pocket (20), wherein the advancing of the pocket (20) takes place via a same running rail (15) as the moving-away of the emptied and closed pocket (20); and
    wherein the at least one end (16) of the material web (18) is releasably configured on the carriage (11) by hooking up the one end (16), in that the pocket (20) to be emptied is stopped and emptied on the running rail (15), in that in step (b) the at least one end (16) of the material web (18) is unhooked and in that in step (d) the at least one end (16) of the material web (18) is hooked up again.

2. The method according to claim 1, wherein after unhooking the material web (18), an unhooked part of the material web (18) is fixed to a suction surface (25a) by a vacuum and for emptying the pocket (20) the fixed material web is pivoted with the suction surface (25a) about a pivot axis (25c) sufficiently far into a downwardly oriented oblique position that the transported goods (28) located in the pocket slip down out of the pocket.

3. The method according to claim 2, wherein a grip element (29) is arranged on at least one end (16) of the material web (18) and a mechanism (25d) for unhooking and/or hooking up the material web (18) arranged on the suction surface (25a) grips and lifts and/or lowers the at least one end (16) of the material web (18) on the grip element (29).

4. The method according to claim 2, wherein the transported goods (28) slipping out of the pocket (20) are conveyed via a slide (26) to a transport device (27, 27a) and transported away by means of the transport device (27, 27a).

5. An emptying device for emptying the pockets (20) of a transport device (10) in the form of a suspension conveyor, comprising:
 one or more carriages (11) moveably mounted on a running rail (15) in a running rail direction;
 a downwardly hanging pocket (20) arranged on each of the one or more carriages (11) for receiving transported goods (28), wherein the pocket (20) is formed by at least one flexible material web (18) which is planar in an open state and advanceable in a closed state, and which pocket (20) is fastened at both ends to the carriage (11), forming a downwardly hanging carrying loop and/or transport loop;
 a first device (25d) configured to automatically open and close the pocket wherein the at least one end (16) of the material web (18) fastened to the carriage (11) is releasable to open the pocket (20) and empty the transported goods (28) from an opened pocket (20) and wherein the at least one end (16) of the material web (18) is fastened to the carriage (11) to close the pocket (20);
 a second device (25) is configured to fold out the opened pocket (20);
 an emptied and closed pocket (20) is loveable via a same running rail (15) as the advanceable pocket (20); and
 at least one end (16) of the material web (18) is releasably configured on the carriage (11) by hooking up the one end (16), in that the pocket (20) to be emptied is stopped and emptied on the running rail (15), in that the open pocket the at least one end (16) of the material web (18) is unhooked and in that in the closed pocket at least one end (16) of the material web (18) is hooked up again.

6. The device according to claim 5, wherein the first device comprises an unhooking and hooking-up mechanism (25d), which comprises an engagement element (25e) which is movable in the vertical direction and which is able to be brought into engagement with a grip element (29) attached to the pocket (20).

7. The device according to claim 6, wherein the second device (25) comprises a suction surface (25a) for the unhooked material web (18) supplied with a vacuum via a vacuum connection (25b), which suction surface (25a) is arranged so as to be pivotable about a pivot axis (25c) in a frame (24) below the running rail (15).

8. The device according to claim 7, wherein a slide (26) which at the upper end adjoins the downwardly pivoted suction surface (25a) is provided.

9. The device according to claim 8, wherein e slide (26) with its lower end adjoins a transport device (27) for transporting away the emptied transported goods (28).

* * * * *